United States Patent [19]

Dover et al.

[11] Patent Number: 4,513,994

[45] Date of Patent: Apr. 30, 1985

[54] CEILING FAN AND OUTLET BOX SUPPORT

[75] Inventors: Donald L. Dover; William J. Leitch, both of Memphis, Tenn.

[73] Assignee: Robbins & Myers, Inc., Dayton, Ohio

[21] Appl. No.: 462,246

[22] Filed: Jan. 31, 1983

[51] Int. Cl.³ .......... F16M 13/00

[52] U.S. Cl. .......... 248/544; 248/57

[58] Field of Search .......... 248/544, 546, 57, D. 6, 248/27.1, 342–345, 340, 216.1, 354 S, 343

[56] References Cited

U.S. PATENT DOCUMENTS

| | | | |
|---|---|---|---|
| 814,811 | 3/1906 | Speed | 248/216.1 |
| 955,135 | 4/1910 | Chlad | 248/343 |
| 1,927,515 | 9/1933 | Eastman . | |
| 2,130,307 | 9/1938 | McGovern | 248/345 |
| 2,461,794 | 2/1949 | Williams | 248/57 |
| 2,528,418 | 10/1950 | Buckels | 248/57 |
| 2,670,919 | 3/1954 | Esoldi | 248/216 |
| 2,713,983 | 7/1955 | Kay | 248/57 |
| 2,770,436 | 11/1956 | Lindhardt, Jr. | 248/57 |
| 3,012,132 | 12/1961 | Rosenfield | 248/343 |
| 3,353,790 | 11/1967 | Sondheim | 248/57 |
| 3,597,889 | 8/1971 | Nigro | 248/57 |
| 3,612,463 | 10/1971 | Grant | 248/57 |
| 3,892,378 | 7/1975 | Lane | 248/57 |

FOREIGN PATENT DOCUMENTS

| | | | |
|---|---|---|---|
| 831386 | 10/1952 | Fed. Rep. of Germany | 248/354.3 |
| 859065 | 12/1940 | France | 248/354.3 |
| 282971 | 9/1952 | Switzerland | 248/354.3 |

*Primary Examiner*—Reinaldo P. Machado
*Assistant Examiner*—Alvin Chin-Shue
*Attorney, Agent, or Firm*—Biebel, French & Nauman

[57] ABSTRACT

A ceiling fan and electrical outlet box support for supporting a ceiling fan between a pair of ceiling joists, includes a transversely oriented rigid threaded rod with a joist engaging piece threadedly received on one of the rod for telescopic movement as the rod is rotated, and a second joist engaging piece rotatably mounted on the other end of the rod whereby upon rotation of the rod the joist engaging pieces may be caused to engage the adjacent inside surfaces of a ceiling joist. The rod is rotated by applying a wrench to a pair of nuts which are jammed together over a prepared ceiling opening at some location between the joists. Hanger brackets in the form of eye bolts are slid onto the rod, on either side of the nuts, and support a generally U-shaped ceiling fan support bracket from the rod and also support an electrical junction box. A block of elastomeric material is positioned between the outlet box and the rigid rod, at the driving nuts, to take up vibration and slack.

1 Claim, 3 Drawing Figures

CEILING FAN AND OUTLET BOX SUPPORT

BACKGROUND OF THE INVENTION

This invention relates to apparatus for supporting a ceiling fan from ceiling joists, and more particularly, to apparatus for supporting a ceiling fan between a pair of ceiling joists and for supporting an outlet box at such location.

In the installation of ceiling fans, it is commonly necessary to provide an anchor or a support which threads directly into a ceiling joist, in order to support the weight of the fan and any accessories, such as lighting fixtures or the like, which may be mounted or supported on the fan. Commonly, ceiling fans in the order of 52" in diameter may weigh in excess of forty pounds, and when lighting fixtures are added, such as large schoolhouse globe or a multiple light fixture, an additional ten pounds or so may be added to the overall weight. It has commonly been advisable to support such fans on a hook-shaped lag screw, threaded directly into a ceiling joist, to provide the necessary support.

In existing homes it has been necessary to locate a junction box outlet immediately adjacent to or in immediate underlying relation to a ceiling joist in order to provide a location for screwing the hook into a wooden ceiling joist. However, such an arrangement necessitates considerable inflexibility in the location of the fan. Often it is not possible to locate the fan in the center of the room. Further, it is often not possible to utilize existing openings in the ceiling, which may already be wired for a chandelier or a ceiling light, or other common lighting fixture, since such junction boxes are, commonly loosely mounted or merely supported on lightweight sheet metal straps and are unsuited for supporting the weight of a ceiling fan. Thus, in such instances, it has been necessary to relocate the outlet box for the purpose of mounting a ceiling fan to a new location, thus requiring the patching or resurfacing of the old opening. This can seldom be done in an existing plaster ceiling, for example, without leaving evidence of the previous location of the ceiling opening.

There is thus a need for a mechanism by which a ceiling fan may be supported directly between a pair of existing ceiling joists and by which a junction box as well as a ceiling fan support may be adjustably positioned between the joists to utilize an existing opening or to permit the location of a new opening at practically any desired position between a pair of joists.

SUMMARY OF THE INVENTION

This invention is directed to an improved hanger bracket particularly adapted for supporting a ceiling fan or the like between a pair of roof joists. The invention includes a relatively rigid threaded rod having one end thereof threadedly mounted on a telescopic piece adapted to engage one of the ceiling joists, and having on the other end thereof a rotatably mounted piece adapted to engage the opposite ceiling joist, together with means for rotating the rod to cause the extension of the telescopic piece thereon while freely rotating in said opposite piece, together with means mounted on said rod for hanging a ceiling fan therefrom and supporting, in conjunction with said hanging means, a junction box.

The means for rotating the rod may conveniently consist of a pair of hex nuts which are freely movable along the length of the rod but which may be torqued together, so that the rod may be rotated as a unit, through a prepared opening in the ceiling and thereafter the ceiling fan support may be attached by means of a pair of eye-bolts, one each positioned on either side of the hex nuts and slidably received on the rod, with a depending threaded portion supporting a generally U-shaped hanger bracket and supporting the junction box.

The arrangement of one extensible member or end piece threaded on a rod with another end piece rotably mounted on the rod, permits one end piece to be first threaded on the rod and then the rod partially unthreaded while held against a ceiling joist, to bring the opposite end piece into engagement with an opposite ceiling joist. The end pieces are preferably formed with joist-engaging serrations or teeth thereon by means of which the end pieces can grip the adjacent exposed surfaces of the joists with the rod firmly extending therebetween.

It is accordingly an important object to provide a low-cost ceiling fan support which is adapted to be mounted between a pair of ceiling joists by operation thereof through a prepared ceiling opening between the joists.

A further object of the invention is the provision of a ceiling fan support including a threaded rod, and an extensible elongated member mounted on one end of such rod for engagement with one ceiling joist and a rotatable member mounted on the opposite end of such rod for engagement with the opposite ceiling joist, together with means for rotating the rod to effect engagement of the members with said joists.

Another object of the invention is the provision of a ceiling fan hanger bracket which is simple in constructure, effective and easy to use, in which a relatively rigid threaded rod is extended between a pair of ceiling joists and includes at least one extensible threaded element on one end thereof for engagement with bne of the ceiling joists and a freely rotatable element on the other end thereof, incorporating a ceiling fan hanging or support bracket which may be readily attached therein in a prepared ceiling opening to extend into the opening for the support of a ceiling fan and, if desired, for the support of an electrical outlet box.

In a particular aspect of the invention, an elastomeric block such as a block of rubber or the like is positioned, in assembly, between the electrical outlet box associated with the hanger bracket and the transverse support rod, at the driving nuts, which block is slightly compressed when the same is assembled thereon, to take up vibration and slack.

These an other objects and advantages of the invention will be apparent from the following description, the accompanying drawings, and the appended claims.

DESCRIPTION OF PREFERRED EMBODIMENT

Figure 1:
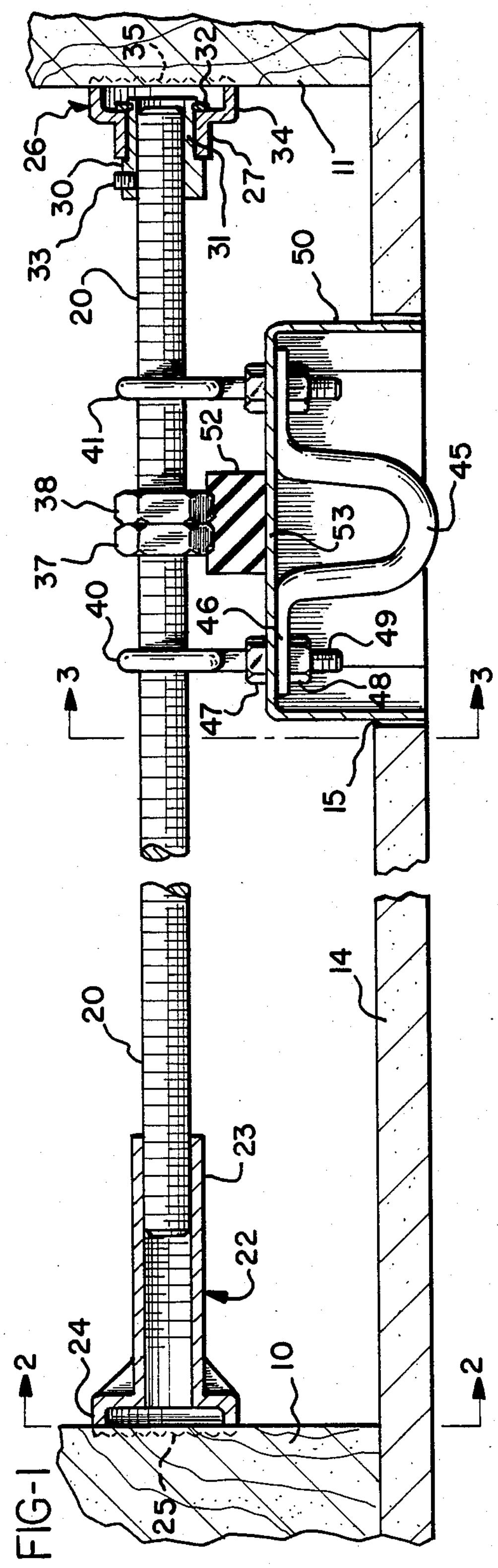
FIG. 1 has an elevational view, partly in section and partly broken away, showing a ceiling fan support hanger of the present invention extended between a pair of ceiling joists, including a junction box mounted thereon shown in cross-section.

Referring to the figures of the drawing which illustrate a preferred embodiment of the invention, an adjustable ceiling fan support in accordance with this invention is illustrated as extending between a pair of ceiling joists 10 and 11 above a ceiling board 14. An opening 15 may be made in the ceiling board 14 at the desired location, such as in the center of a room, or at some other convenient location between the overhead ceiling joists. Often, such a ceiling opening has already been made and is in use, providing for an outlet for a ceiling light, a chandelier or the like. The mounting of the outlet box or electrical connection at such a location is usually inadequate for the purpose of supporting a ceiling fan.

The support or hanger of the present invention is particularly adapted for use with ceiling fans, and includes an elongated threaded rod 20 which extends substantially the distance between the ceiling joists 10 and 11. The rod 20 is preferably threaded throughout its length and may, for example, be ½" in diameter. For example, in use in homes with ceiling studs mounted on 16" centers, a 12" rod would be used and for use in homes with ceiling studs mounted at 24" centers, a 20" rod would be used.

Figure 2:
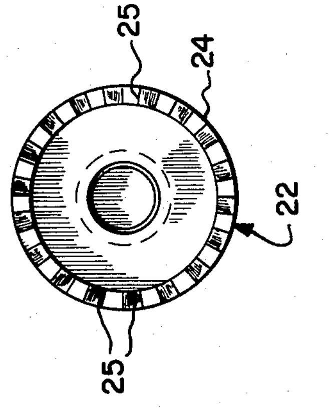
FIG. 2 is an end view of the support looking generally along the lines 2—2 of FIG. 1.

Means on the rod for engaging the adjacent ceiling studs includes a first elongated threaded end piece 22, as shown in FIGS. 1 and 2. The end piece 22 has an elongated tubular threaded portion 23 with inside threads adapted to be received on the rod 20. The piece 22 has an enlarged joist gripping outer end 24. The enlarged end 24 has an outer face thereof for frictionally engaging the adjacent surface of a ceiling joist. For this purpose, the face of the end 24 may consist of an annular series of teeth or serrations 25 which can bite into the wood and firmly support the rod in a fixed location.

The remote or opposite end of the rod 20 is provided with a second end piece 26 for engaging the adjacent surface of the joist 11. For this purpose, the end piece 26 is provided which has a tubular body 27 adapted to be rotatably mounted with respect to the rod on a cylindrical adapter or coupler 30. The coupler 30 is formed with a shouldered body which has a reduced diameter portion 31 adapted to receive the cylindrical body 27 of the piece 26 thereon providing for rotation of the piece 26, retained in place by a snap ring 32. The coupler 30 is fixedly mounted on the terminal end of the rod 20 by means of a set screw 33 extending therethrough and into engagement with the threads of the rod 20 for holding the coupler 30 in a given position at the end of the rod.

The piece 26 has an enlarged joist engaging end 34 defining an annular series of serrated teeth 35 similar to the end 24 and teeth 25 of the piece 22, for bitingly engaging the adjacent surface of the joist 11.

Means for gripping the rod 20 to cause rotation provide for extending or retracing movement of the piece 22 comprises a pair of hex nuts 37 and 38 mounted together on the rod, and adapted for rotation by application of a wrench or pliers thereto. The use of a pair of nuts permits the same to be run at any desired position along the rod, so as to permit alignment of the same with respect to the center of a prepared ceiling opening. The two nuts are then jammed together to form in effect a unitary rod drive means.

Figure 3:
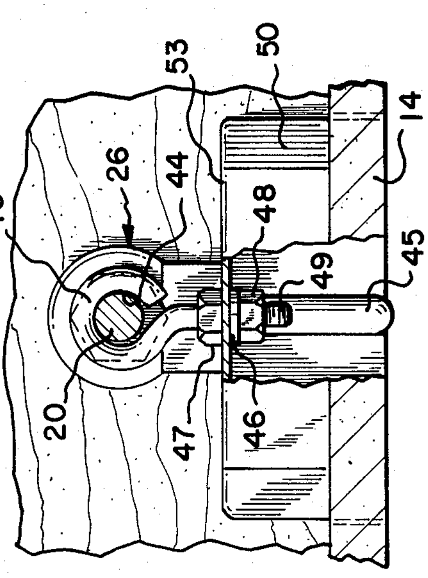
FIG. 3 is a transverse section through the support looking generally along the lines 3—3 of FIG. 1.

Hanger means for supporting a ceiling fan, as best shown in FIG. 3, comprises a pair of closed loop eye bolts 40 and 41, one each positioned on either side of the nuts 37 and 38. The loop 44 of the eye bolts 40 and 41 freely slide on the rod 20 and the bolts depend therefrom. The eye bolts support therebetween a generally U-shaped ceiling fan depending bracket 45. The bracket 45 has a U-shaped body with flattened pierced ends 46 received between nuts 47 and 48 on the threaded portions 49 of each of the eye bolts. A conventional standard ceiling junction box 50, such as a conventional 3½" square by 1½" deep box, may also be supported between the flattened ends 46 of the ceiling fan hanger bracket and the upper nuts 47.

In the assembled relation, as shown in FIG. 1, a solid block 52 of elastomeric material such as rubber is preferably positioned between the bodies of the nuts 37 and 38 and the top panel 53 of the box 50, so that when the box and the hanger bracket 45 are positioned on the threaded portions 49 of the eye bolts 40 and 41, the block is slightly compressed, tending to absorb vibration and tending to take up any of the slack formed between the loops 44 of the eye bolts and the rod 20 extending therethrough. The block or pad 52 may conveniently be attached to the upper surface of the junction box 50 by means of an adhesive pad formed on the back of the block 52, prior to assembly, for locating the same in the desired position.

In the operation of the invention, the end pieces 22 and 26 are assembled on the rod 20, with the tubular body portion 23 of the end piece 22 extended to a substantial depth on the body 20. The coupler or adapter 30 is threaded onto the opposite end and secured by the set screw 33, with the end piece 26 in place as secured by the snap ring 32.

The eye bolts 40 and 41 are slid onto the rod loosely on either side of the pair of nuts 37 and 38 and this assembly is now inserted through a prepared opening formed in the ceiling board 15.

By using a hand extended through the opening, the ceiling joist 10 is first located and the threaded coupler 22 lightly pressed against the joist to prevent the same from rotating, while the rod is rotated counterclockwise to bring the opposite piece 26 into engagement with the opposite joist. The hex nuts 37 and 38 are located centrally of the opening and are torqued together so that the same may now be rotated as a unit and rod 20 rotated to cause the piece 22 to be extended further therefrom, while driving the opposite end, including the teeth 25 and 35 into firm engagement with the surfaces of the joists. It is not necessary that the rod be perfectly aligned normal to the joist as slight misalignment does not adversely effect the security of the connection therebetween.

The upper nuts 47 may now be threaded onto the threaded eye bolts, and the junction box 50 brought up into place through the ceiling opening 15 with the rubber isolation block 52 attached. Thereafter the U-shaped ceiling fan support bracket 45 has its opposite flattened ends slid onto the eye bolts and the lower nuts 48 are assembled, causing the bracket to be firmly gripped, and at the same time, causing the block 52 to be somewhat compressed between the top 53 of the electrical junction box 50 and the drive nuts on the rod 20. In this manner, the closed eye portions of the eye bolts are brought down to bear against the upper surface of the rod 20, taking up all of the slack.

A ceiling fan may then be hung from the bracket 45 and the electrical connections made through the junction box 50, in the conventional manner.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A hanger and junction box assembly for supporting a ceiling fan or the like between a pair of ceiling joints, comprising:

an elongated threaded rod having a length less than the transverse space between said joists, a first support piece having a tubular end thereof threaded on an end of said rod for extension and retraction movement in response to relative rotation between said piece and said rod, means on the end of said support piece defining an enlarged joist-gripping end remote from said rod, a second support piece having a tubular body and an enlarged joist-gripping end, an adapter mounting said second support piece on the opposite end of said rod for relative rotation into said second piece while maintaining a relatively fixed axial location with respect to said rod, a pair of engagement nuts on said rod for applying a wrench or the like thereto for causing rotation of said rod when in an engageable position to bring said pieces into physical engagement with the adjacent surfaces of a spaced ceiling joist, said nuts being movable axially of said rod into selected drive positions to provide for access thereto through a prepared ceiling opening, a pair of hanger eye bolts, one each slidably received on said rod on opposite sides of said nut and each having a threaded depending portion, a junction box supported on said depending portions at said ceiling openings, a block of elastomer compressed between the upper surface of said box and said nut to take up slack between said eye bolts and said rod, and a generally U-shaped ceiling for hanging bracket carried on said depending portions in said box for supporting a ceiling fan thereon.

* * * * *